United States Patent [19]

Reiche et al.

[11] Patent Number: 4,874,677

[45] Date of Patent: Oct. 17, 1989

[54] MATRIX MATERIAL FOR REGENERATORS

[75] Inventors: Dieter Reiche, Dresden; Matthias Thuerk; Roderich Duerselen, both of Jena, all of Fed. Rep. of Germany

[73] Assignee: Veb Hockvakuum Dresden, Dresden, German Democratic Rep.

[21] Appl. No.: 247,021

[22] Filed: Sep. 20, 1988

[30] Foreign Application Priority Data

Nov. 2, 1987 [DD] German Democratic Rep. ... 308515

[51] Int. Cl.[4] .......... B23P 17/06

[52] U.S. Cl. .......... 428/605

[58] Field of Search .......... 428/605

[56] References Cited

U.S. PATENT DOCUMENTS 2,275,085 3/1942 Michel .......... 428/605

3,049,796 8/1962 Pall .......... 428/605

*Primary Examiner*—Peter D. Rosenberg

*Attorney, Agent, or Firm*—Jordan and Hamburg

[57] ABSTRACT

A matrix material for regenerators, comprises a stable basic mesh with wire diameters between 0.005 and 0.015 mm and a lead sheathing with a thickness of 0.025 to 0.075 mm. This lead screen mesh can be stacked very easily to form a matrix material. In order to form the mesh, an available fine-mesh metallic screen mesh, for example, of brass, bronze, or high-grade steel, is etched by a wet chemical or electrochemical means, until the mesh has been thinned down to the required wire thickness of between 0.005 an 0.015 mm. Subsequently, this thinned-down mesh is electroplated with lead up to the desired technological mesh width, or is coated with a lead layer that is 0.025 to 0.075 mm thick.

4 Claims, 1 Drawing Sheet

MATRIX MATERIAL FOR REGENERATORS

FIELD OF THE INVENTION

The invention relates to a matrix material for regenerators, especially for high capacity regenerators with operating temperatures below 70° K.

BACKGROUND OF THE INVENTION

In modern physics, small-type refrigerating machines are increasingly being used to generate low temperatures (70° K. to 20° K.) with refrigerating capacities of up to 5 W. One of the most important functional elements of such small-type refrigerating machines is a regenerative heat exchanger (regenerator).

In the first stage, in the temperature range from 300° K. to 70° K., the corresponding high-capacity regenerators of Gifford-McMahon use a regenerator packing of wire meshing with wire diameters from 0.05 to 0.03 mm. For the second temperature stage, with working-gas temperatures below 70° K., oxide-free lead powder is used on account of its high volumetric heat capacity, since no lead wire meshing with the required dimensions is available (Walker, Cryocoolers, Part II, p. 45, Plenum Press, 1983).

The desired optimum porosity of the low-temperature packing is at 0.05 to 0.1 (Radebaugh, First Step to the Optimization of Regenerator Geometry, NBS-SP-698, May 1985). This desired optimum arises from the partly oppositely acting individual loss mechanisms of the heat transfer, of the limited specific heat capacity, of the flow pressure losses, of the dead volume and of the axial heat conduction. The prior art can achieve the aimed for porosity optimum of 0.05 to 0.1 by means of lead powder-filling; practically, however, porosities of only 0.37 to 0.4 are achieved. With ideal dense spherical packings, a value of 0.25 could be attained. However, the lead powder particles used, with average diameters of 0.1 to 0.25 mm, cannot be produced with an ideal spherical shape. Furthermore, the operating conditions of a small-type refrigerating machine require that the working gas flows rapidly around the matrix body. When conventional spherical bed fillings are used, a semi-fluid state of the fixed bed results from the flow pressure loss at the individual particles, since the pressure loss is of the order of the particle weight per flow surface. This causes a swirling of the particles. For this reason, the spherical bed filling must be subjected to mechanical pressure. The mechanism required for this increases the dead volume in the regenerator. This has a negative effect on the conduct of the process.

German Offenlegungsschrift 3,044,427 discloses a sintered metal for use in the low temperature section of the regenerator. Low porosities can indeed be achieved with this material. However, these sintered metals have heat bridges that conduct well. This causes undesirably high heat conduction and thus once again leads to large losses of effectiveness.

OBJECT OF THE INVENTION

The invention is therefore directed to a method and material for improving the effectiveness of high-capacity regenerators and of lowering the economic outlay.

It is a further object of the invention to provide a lead screen mesh, with which, when said mesh is stacked as a matrix material, porosities of less than 0.25 can be achieved. It is furthermore an object of the invention to provide a method for producing such screen meshes.

SUMMARY OF THE INVENTION

Pursuant to the invention, this objective is accomplished with a lead screen mesh, which comprises a stable basic mesh with wire diameters between 0.005 and 0.015 mm and a lead sheathing with thicknesses from 0.025 to 0.075 mm. Such a screen mesh combines the high mechanical load-bearing capacity of a suitable basic mesh, for example, a bronze wire mesh, with the desired regenerative properties of lead (high thermal conductivity and high volumetric heat capacity). This lead screen mesh can be stacked very simply to form a matrix material. It offers the possibility of varying within wide limits the properties that affect the process, such as porosity and heat transfer area. A regenerator material is thus provided, which can be matched optimally to the particular process conditions.

Aside from a sufficiently low heat conduction, it is also possible to achieve porosities of less than 0.25.

The lead-sheathed screen mesh packings also make it possible to construct matrix packings, which are resistant mechanically and hydrodynamically under operating conditions. With this, the mechanical devices for maintaining a stable matrix packing may be omitted, so that the dead volume is minimized in the regenerator itself.

The matrix material, in the form of a stack of the specified screen mesh, can also be varied further, depending on the requirements. For example, it is possible to construct the matrix material in such a fashion that other screen meshes of similar geometry, or foils with high gas permeability but low heat conduction, are disposed alternately between one or more lead-sheathed screen meshes. For example, the "stable basic mesh" can be used as such another screen mesh.

Especially the axial heat conduction can be affected by such a variation. With this, it is also possible to achieve quasi-continuous distribution of the above properties along the longitudinal axis of the regenerator, so as to improve the adaptation to the optimal conduct of the process.

A special method will be given below for producing the lead-sheathed screen mesh that comprises an element of the inventive matrix material.

BRIEF FIGURE DESCRIPTION

In order that the invention may be more clearly understood, it will now be disclosed in greater detail with reference to the accompanying drawing, wherein.

DETAILED DESCRIPTION OF A PREFERRED EMBODIMENT

Figure 1:
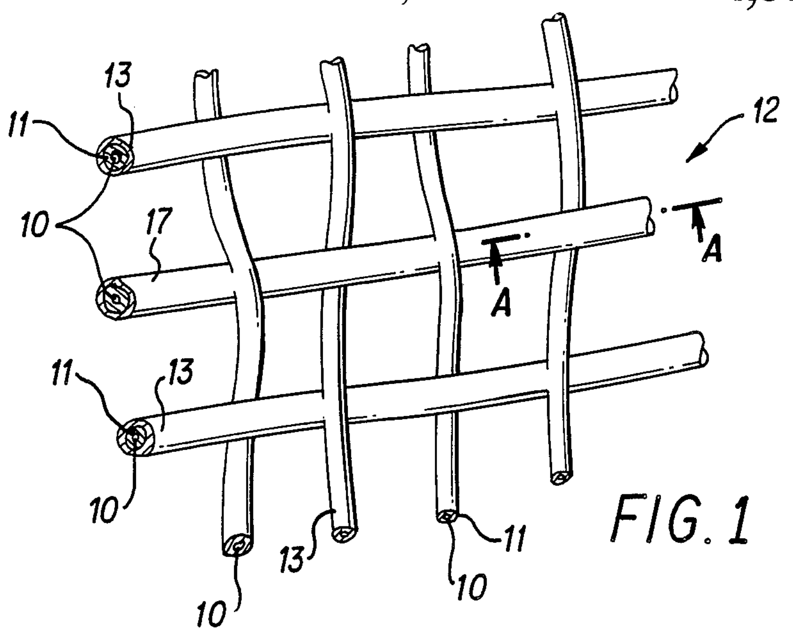
FIG. 1 is a perspective view of a mesh.
Figure 3:
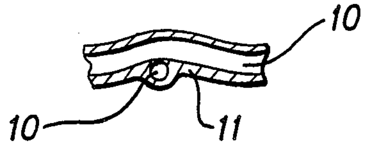
FIG. 3 is a cross sectional view of the mesh of FIG. 1, taken along the lines A—A.
Figure 2:
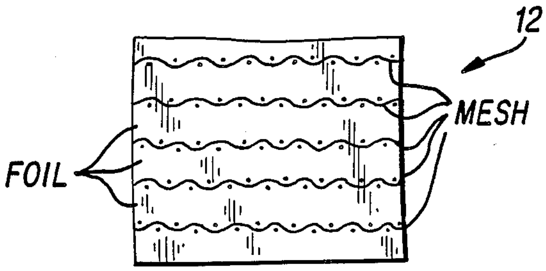
FIG. 2 is a side view of a stack of meshes.

Pursuant to this method, an available fine-mesh metal screen mesh, for example, of brass, bronze, or high-quality steel, is used. It is etched by a wet chemical process or electrochemically until the mesh has been thinned down to the required wire thickness of between 0.005 and 0.015 mm. Then this thinned-down mesh 10, as illustrated in FIGS. 1-3, is plated with lead 11 until it is sheathed to the desired technological mesh width or sheathed to a lead layer thickness of 0.025 to 0.075 mm. A lead screen mesh 12 produced in this fashion has adequate mechanical stability and, in addition, has essentially the physical properties of an original lead screen.

The screen mesh produced pursuant to the invention can be modified still further in accordance with the method. For example, the lead surface can be hardened, that is, its mechanical stability can be increased. For this purpose, a protective layer 13 can be applied by plating or by vacuum coating. Furthermore, ion implantation with antimony, tin, calcium, barium, sodium, potassium, lithium, magnesium, and the like is possible. Variations can also be achieved with alloying components.

By specifically controlling the electroplating process for depositing the lead, different surface roughnesses can also be achieved. With that, the heat-exchanging surface and thus the heat transfer can be modified while the amount of lead and the porosity remain the constant.

The invention will be explained in more detail by means of an example of the operation. For this purpose, the production of a lead screen pursuant to the method will be described first, after which its use will be described.

As a basic mesh, a brass screen mesh with a wire diameter of 0.063 mm and 110 meshes per cm is used.

In a 6% $FeCl_3$ solution, this screen mesh was thinned down to a wire diameter of 0.02 mm and rinsed in distilled water.

The electrolyte solution consists of 6.5 molar percent PbO, 14 molar percent $HClO_4$, and 79.5 molar percent distilled water, with 3 grains gelatin per 100 g electrolyte. The electrolyte is produced as follows:

The PbO is dissolved while slowly adding $HClO_4$. This is a strongly exothermic process. Then the distilled water and the gelatin are added.

With a spacing of 3 cm between the screen cathode and the 2-dimensional lead anode, and with a current density of 300 $A/m^2$, the lead sheathing is plated on up to about three-quarters of the required lead thickness.

The screen cathode is then turned, so that side that originally faced away from the lead anode now faces it. The final lead thickness is plated on at a current density of 100 $A/m^2$.

In the example, a lead screen mesh with an average total "wire diameter" of 0.13 mm was produced.

In the simplest form as seen in FIG. 2, these individual screen meshes 12 are stacked on top of one another to a height of about 50 mm, depending on the requirements, and are used as a matrix material in the low temperature stage of a high-capacity regenerator with operating temperature below 70° K.

Further possible variation of the matrix material were given in detail in the specification and can be realized as required.

Porosities of about 0.23 are realized with the matrix material described in the example.

We claim:

1. A matrix material for regenerators, comprising a plurality of screen meshes, each of which consist of a stable basic mesh, with wire diameters between 0.005 and 0.015 mm and of a lead sheathing with a thickness of 0.025 to 0.075 mm, is layered into a stack.

2. The matrix material of claim 1, wherein, between the screen meshes that are sheathed with lead and alternating with them, a different screen mesh with similar geometry, or foils with greater gas permeability and low heat conductivity, are disposed.

3. The matrix material of claim 1, wherein the other screen mesh comprises the stable basic mesh.

4. A method for producing a fine-mesh lead-sheathed screen for use as matrix material of regenerators, comprising thinning a stable wire screen mesh down by electrochemical or wet chemical means to a residual wire thickness of less than 0.015 mm, and subsequently electroplating the thus thinned mesh with lead up to the required layer thickness.

* * * * *